United States Patent [19]

Somemiya et al.

[11] 4,335,233

[45] Jun. 15, 1982

[54] POLYPHENYLENE ETHER COPOLYMERS

[75] Inventors: Akiyoshi Somemiya, Akashi; Shunitsu Miyashita; Masaaki Azuma, both of Kobe, all of Japan

[73] Assignee: Kanegafuchi Kagaku Kogyo Kabushiki Kaisha, Osaka, Japan

[21] Appl. No.: 249,996

[22] Filed: Mar. 30, 1981

[30] Foreign Application Priority Data

Mar. 31, 1980 [JP] Japan ................................. 55/42171

[51] Int. Cl.$^3$ ............................................ C08G 65/44
[52] U.S. Cl. ................................................ 528/211
[58] Field of Search ....................................... 528/211

[56] References Cited

U.S. PATENT DOCUMENTS 4,094,860 6/1978 Valaitis et al. ..................... 528/211

Primary Examiner—Maurice J. Welsh
Attorney, Agent, or Firm—Moonray Kojima

[57] ABSTRACT

A polyphenylene ether copolymer produced by oxidative coupling of 60 to 99.9 mole percent of a phenol with 0.1 to 40 mol percent of an aniline. The inventive copolymer has improved heat resistance, shock resistance, and tensile strength. When used by itself or in a mixture with other polymers, such as polystyrene or ABS resins, the inventive product is useful as an excellent engineering material.

5 Claims, No Drawings

POLYPHENYLENE ETHER COPOLYMERS

BACKGROUND OF THE INVENTION

1. Field of the Invention

This invention relates to polyphenylene ether copolymers, and more particularly, to such copolymers obtained by oxidative coupling copolymerization of phenols and anilines, and having improved properties, such as improved heat resistance.

2. Description of the Prior Art

Polyphenylene ethers are high molecular compounds obtained by oxidative coupling polymerization of phenols, and generally have good mechanical properties. Particularly, themoplastic resins obtained by blending the polyphenylene ethers with polystyrene polymers, are widely used because of their balance of chemical, and physical properties, and for moldability.

Prior art polyphenylene ethers are, however, deficient in other respects, such as, for example, they are not always satisfactory in resistance to deterioration by heat or photo-oxidation.

Moreover, attempts have been made in the prior art to improve the mechanical properties of various engineering resins, by incorporating fibers or fillers therein. It is common to use such fibers or fillers for surface treatment to accomplish that purpose.

Polyphenylene ethers are usually prepared by dehydration and condensation of phenols by oxidative coupling as hereinabove stated. This is a special type of polycondensation reaction, and there is a limitation as to the applicable monomers to be used therein. The polyphenylene ether copolymers obtained by oxidative coupling, as heretofore proposed in the prior art, are all of the polyether structure. For example, they include halophenol copolymers, such as disclosed in Japanese Pat. Nos. 14833/1964 and 22269/1965; 2,3,6-trimethylphenol copolymers, such as disclosed in Japanese Pat. No. 17880/1977; cresol copolymers such as disclosed in Japanese Pat. No. 144097/1977; bisphenol copolymers such as disclosed in Japanese Pat. No. 5864/1976; naphthol copolymers such as disclosed in Japanese Pat. No. 104298/1975; and 2,6-diphenylphenol copolymers such as disclosed in Japanese Laid Open Patent Specification No. 56298/1978.

SUMMARY OF THE INVENTION

It is an object of this invention to provide novel polyphenylene ether copolymers produced by oxidative coupling of phenols and anilines, and having improved thermal stability and improved chemical properties.

It is another object of this invention to provide novel polyphenylene ether copolymers of the polyphenylene ether structure and having improved chemical properties.

The polyphenylene ether copolymers of this invention are obtained preferably by oxidative coupling polymerization of phenols represented by formula (1) hereinbelow, and anilines represented by formula (2) hereinbelow:

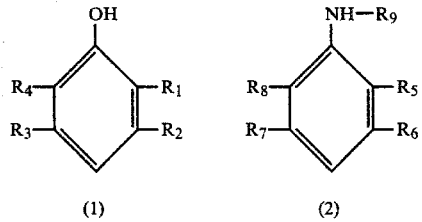

wherein $R_1$ to $R_8$, each stand for hydrogen, a hydrocarbon group, or a substituted hydrocarbon group, and $R_9$ stands for a hydrocarbon or substituted hydrocarbon group usually having 1 to 18 carbon atoms.

Typical examples of phenols represented by above structural formula (1) include o-cresol; 2,6-dimethylphenol; 2,6-diethylphenol; 2,6-diphenylphenol; 2,3,6-trimethylphenol; 2,6-dibutylphenol; 2-methyl-6-cyclohexylphenol; and 2-methyl-6-ethylphenol. Typical examples of the anilines represented by the above structural formula (2) include N-methylaniline; N-ethylaniline; N-butylaniline; 2-methyl-N-phenylaniline; N-methyl-2-methylaniline; 2,6-dimethyl-N-methylaniline; and diphenylamine and 3-methyldiphenylamine. These phenols and anilines may be both used either singly or in a mixture of two or more of each.

The structural unit of the copolymer according to this invention are preferably represented by the following general formulae:

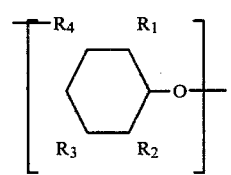

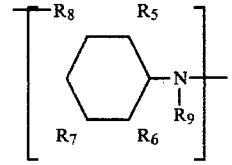

where the $R_1$ to $R_9$ are defined above.

DETAILED DESCRIPTION OF THE PREFERRED EMBODIMENTS

The copolymer of this invention may be preferably manufactured by a method which is substantially the same as a known method for the polymerization of phenols by oxidative coupling. Thus, polymerization is carried out while a mixed solution containing starting monomers, a catalyst, a promoter and a solvent, is strongly stirred, and an oxygen containing gas is injected thereinto. Examples of applicable catalyst include copper-amine complex, cobalt-amine complex, manganese-alkoxide complex, bis(salicylaldehyde)ethylenediiminatocobalt, bis(salicylaldehyde)ethylenediiminatomanganese, bis(salicylaldehydealkyliminato)manganese, and manganese-amine-phenoxide complex. A promoter selected from among amines, alkalis, alkoxides and phenoxides may be used singly or in a mixture of two or more thereof. It is desirable to use a a catalyst containing manganese particularly if its is intended to produce a polymer having a high degree of polymerization. The quantity of catalyst to be used may be equal to, or slightly greater than that which is customarily employed for polymerization of polyphenylene ethers. Any suitable organic solvent may be used for the reaction, including benzene, toluene, chloroform, methylene chloride, acetone, methyl ethyl ketone, ethanol, methanol, isopropanol, ethyl acetate, tetrahydrofuran, dimethylformamide, and dimethylsulfoxide. The solvents may be used singly or as mixture of two or more. Polymerization may be carried out at a temperature which is equal to the temperature employed for the homopolymerization of phenols, but usually not higher than 80° C., so that possible side reactions may be prevented.

A polymer which is suitable for use as an engineering resin, can be obtained if the reaction is performed for a preferable period of three minutes to ten hours, more preferably five minutes to five hours, in the case of batch polymerization. The high polymer of this invention can also be manufactured by continuous polymerization in accordance with a method which is substantially the same to that disclosed, for example, in Japanese Pat. Nos. 28919/1974 and 17077/1977, for the continuous polymerization of phenols.

The formula (2) refers to N-substituted aniline, as would be evident to the worker skilled in the art.

The method used for recovery of the product, depends on the system of polymerization used. If the product is obtained from the reaction system in the form of a solution, an alcohol containing a small quantity of an acid, such as hydrochloric acid, may be added thereinto for its recovery. If precipitation polymerization is employed, such as the one described in Japanese Pat. No. 28919/1974, a granular precipitate is separated from the liquid reaction product, and washed with an alcohol containing a small quantity of an acid, whereby a colorless or light yellow powder is obtained.

The copolymer of this invention preferably contains 60 to 99.9 mol percent phenol or phenols, and 0.1 to 40 mol percent of an aniline or anilines. If the inventive copolymer has a high aniline content, it has a brown color. Accordingly, if any such color of the product is objectionable, such as when the product is used as an engineering resin, it is preferable that not more than 10 mole percent of an aniline or anilines be incorporated therein, although this percentage does not limit the scope of this invention.

A suitable degree of polymerization depends on the purpose for which the product will be used. If the product is to be used as an engineering resin, it should preferably have a polymerization degree of at least 50. If the product is to be used as a heating medium, it should preferably have a polymerization degree of 10 or below.

The structure of the polymer has been ascertained by infrared absorption, ultraviolet and NMR spectra, elemental analysis, GPC and the like. As a result, absorption bands, which are due to C-N stretching vibration, and di- and mono-substituted phenyls have been observed in the infrared absorption spectra of a 2,6-dimethylphenoldiphenylamine copolymer. These absorption bands have been more clearly ascertained by a difference spectrum between the homopolymer of 2,6-dimethylphenol and the aforesaid copolymer of 2,6-dimethylphenol and diphenylamine. The absorption bands which are due to di-substituted phenyl have been found to include one which is due to 1,4-di-substituted phenyl. However, an absorption for the 1,2-di-substitution was not separated from another absorption for mono-substitution of diphenylamine. An absorption characteristic of an aromatic tertiary amine has been observed in the ultraviolet absorption spectrum of the same copolymer and a lower degree of crystallinity has been observed in the X-ray scattering spectrum of the copolymer than in that of the homopolymer of 2,6-dimethylphenol. Certain relationships have been recognized in the results of elemental analysis. For example, there has been observed such relationships as the absorption strength due to the H of phenyl groups other than 1-,2-,4-, and 6-tetra substituted phenyls in the 'H-NMR spectrum, the absorption strength of the aromatic tertiary amine in the ultraviolet spectrum, and the crystallinity of the polymer.

The proportion of the anilines in the product can be determined by elemental analysis, or precision analysis according to the Kjeldahl method. If the product is intended for use as an engineering resin, its aniline proportion is preferably in the range of 0.1 to 10 mol% and particularly in the range of 1 to 5 mol % in view of the physical and chemical properties required, and the abnormal coloration of the polymer, to be prevented.

The polymer can be put to practical use by molding, in accordance with a variety of methods. It is advisable to employ an agent for preventing its deterioration by heating during molding. It is possible to use any agent employed for preventing deterioration of polyphenylene ethers by heat. Examples of such applicable agents, include phosphite esters such as triphenyl phosphite and tricresyl phosphite, phosphorous amides such as triphenyl phosphite amide, boron oxide, boric acid esters such as pyrocatechinboric acid, phosphoric amides such as hexamethylphosphoramide, sulfides such as zince sulfide, hindered pheonls, such as 2,6-di-butyl-4-methylphenol and mixtures thereof.

It will be sufficient to incorporate a smaller quantity of such agent into the polyphenylene ether homopolymer and therefore obtain a product of higher performance. It is also possible to add other agents such as for preventing deterioration by light, and improving the workability of the polymer, or to blend it with other kinds of polymers, such as polystyrene, high impact polystyrene, AS and ABS resins, MBS resin, polycarbonate, polysulfone, EPDM and SB rubber, to form a polymer alloy.

It is also a useful modification, to prepare a graft copolymer, having vinyl monomer grafted onto the present polymer, e.g. in the presence of initiators for radical or ion polymerization.

The copolymer of this invention also manifests improved properties when it is blended with a filler such as glass fibers, calcium carbonate, calcium silicate and clay. Moreover, it has improved adaptability for painting and plating. The inventors of this invention believe that the improved properties of the copolymer produced according to the invention, are attributable to the presence of a tertiary amino group therein.

This invention is, thus, of significant value, as it improves the deficiencies of prior prior polyphenylene ethers, and enables a wider range of application therefor, especially when used as an engineering resin.

The invention will now be further described with reference to actual examples, which examples, are illustrative and not to be considered to be limiting in any manner.

chloroform-methanol in accordance with the procedures disclosed in Japanese Laid-Open Patent Specification No. 4888/1972. The X-ray scattering spectra of these polymers indicated a reduction in their crystallinity with an increase in the degree of copolymerization of the amine therein, as follows:

|  | Crystallinity Percent |
| --- | --- |
| 2,6-xylenol homopolymer | 32 |
| Copolymer of Example 9 | 21 |
| Copolymer of Example 8 | 11 |
| Copolymer of Example 7 | 6 |

Due to the reduced crystallinity, it is understood that the present polymer has also improved chemical and mechanical properties such as compatibility with polystyrne or other polymers, and elongation.

EXAMPLE 11

The procedure of Example 3 was followed, except that 2,5-diethylphenol was used in pl-ce of 2,6-dimethylphenol. The obtained polymer was found to contain 2.3 mol % thereof and to have viscosity $[\eta]$ of 0.63.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A polyphenylene ether copolymer produced by oxidative coupling of 60 to 99.9 mol % of a phenol represented by formula (1) hereinbelow, and 0.1 to 40 mol % of an aniline represented by formula (2) hereinbelow:

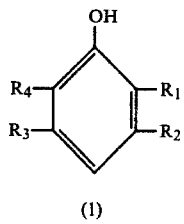
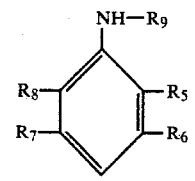

(1)        (2)

wherein $R_1$ to $R_8$ each represents hydrogen, a hydrocarbon group or a substituted hydrocarbon group, and $R_9$ represents a hydrocarbon or substituted hydrocarbon group.

2. The copolymer of claim 1, wherein said phenol is a 2,6-di-substituted phenol.

3. The copolymer of claim 1, wherein said aniline is a N-substituted aniline.

4. The copolymer of claim 1, wherein said aniline is present in an amount of from 0.1 to 10 mol percent.

5. The copolymer of claim 4, wherein said amount of aniline is from 1 to 5 mol percent.

EXAMPLES 1,2,3,4

A mixed solution was prepared from 48 g of 2,6-xylenol, 12 g of diphenylamine, 9 g of bis(salicylaldehyde)ethylenediiminatomanganese(II) ethylenediamine, 210 ml of toluene and 90 ml of methanol, and placed in a 500 ml flask. The flask was placed in a bath of water at 50° C. and oxygen was injected thereinto, while its contents were being vigorously stirred. Polymerization took place. The precipitation of polymer particles was observed 10 minutes after the reaction was started. The reaction products were sampled at each of 10, 20 and 40 minutes after the initiation of reaction. Samples thus obtained were washed with methanol containing a small quantity of hydrochloric acid, to yield light yellow polymers. The polymers were refined by repeating precipitation five times with toluene and methanol.

The results of the examples were as follows:

| Example | Reaction Time (min) | [η] | Amine mol % |
|---|---|---|---|
| 1 | 5 | 0.10 | trace |
| 2 | 10 | 0.30 | 1.9 |
| 3 | 20 | 0.83 | 2.1 |
| 4 | 40 | 1.81 | 2.1 |

The values of [η] were determined in chloroform at 25° C.

As the above results indicate, there was no substantial change in mol % of copolymerization of diphenyl amine despite the increase in [η] in the range of 0.30 to 1.81 and virtually no amine was found in the sample of which the value of [η] was 0.1. These results are considered to indicate the copolymerization of the amine substantially in a random fashion. The analysis by GPC of the sample according to Example 3 indicates that it is a single polymer having only a single peak at a molecular weight of 42,000 (based on PS).

COMPARATIVE EXAMPLE 1

A polymer was prepared in accordance with the procedure of Example 3, except that 12 g of 2,6-xylenol were used instead of 12 g of diphenylamine. No nitrogen was detected as a result of its elemental analysis for C, H, N and O. Its [η] value was 0.86.

COMPARATIVE EXAMPLE 2

The procedures of Example 3 were repeated, except for the use 48 g of diphenylamine instead of 48 g of 2,6-xylenol. There was no precipitation of polymer particles, as opposed to Examples 1 to 4, and Comparative Example 1. One liter of methanol was added into the reaction mixture, but it was still impossible to obtain an polymer.

EXAMPLE 5

A mixed solution was prepared from 54 g of 2,6-dimethylphenol, 26 g of N-methylamine, 9 g of bis(salicylaldehyde)ethylenediiminatomanganese(II)ethylenediamine, 210 ml of toluene and 90 ml of ethanol, and placed in a 500 ml flask. The flask was placed in a bath of water at 40° C. and oxygen was injected thereinto, while its contents were being vigorously stirred, to obtain polymerization for a period of 20 minutes. Precipitation of polymer particles was observed about 10 minutes after the reaction was started. Upon completion of the reaction, the precipitated particles were separated, and washed with methanol containing a small quantity of hydrochloric acid, to yield a light yellow polymer. The polymer was refined by repeating precipitation five times in toluene and methanol.

The polymer thus obtained had a value of [η] of 0.55, and its elemental analysis for C, H, N and O indicated the presence of 1.8 mo % of N-methylaniline. The analysis of the polymer by GPC indicated that it was a polymer having peak at a molecular weight of 90,000. (based on PS).

EXAMPLE 6

A mixed solution was prepared from 2 g of 2,6-dimethylphenol, 0.1557 g of diphenylamine, 0.0868 g of bis(salicylaldehyde)ethylenediiminatomanganese(II)ethylenediamine, 11.13 ml of xylene and 4.77 ml of methanol, and placed in a 500 ml flask. The flask was placed in a bath of water at 10° C., and oxygen was injected thereinto, while its contents were vigorously stirred, to obtain polymerization for a period of one hour. The precipitation of polymer particles was observed about 20 minutes after start of reaction. Upon completion of reaction, the precipitated particles were separated, and washed with methanol, containing a small amount of hydrochloric acid, to yield a light yellow polymer. The polymer was refined by reprecipitation in toluene-methanol. Its elemental analysis for C, H, N and O indicated the presence of 2.2 mol % of N, N-diphenylamine.

EXAMPLE 7

A mixed solution was prepared from 20 g of 2,6-xylenol, 55 g of diphenylamine, 7.8 g of bis(salicylaldehyde)ethylenediiminatomanaganese(II)ethylenediamine, 110 ml of carbon tetrachloride and 48 ml of butanol, and placed in a one liter flask. The flask was placed in a bath of water at 35° C., and oxygen was injected thereinto, whiles its contents were stirred vigorously, to produce polymerization. The precipitation of polymer particles was observed 1.5 hours after start of reaction. The reaction was continued for 2.5 hours. The precipitate particles were separated, and washed with methanol, containing a small quantity of hydrochloric acid, to yield a light green polymer. The polymer was refined by reprecipitation, in toluene-methanol.

Elemental analysis of the polymer for C, H, N and O indicated presence of 14.9 mol % of diphenylamine copolymerized therein. The yield was 60% by weight. The ultraviolet spectrum of the polymer showed an absorption at 303 nm due to the presence of an aromatic tertiary amine, in addition to the absorption observed in a 2,6-xylenol homopolymer at 243, 277 and 283 nm. The starting diphenylamine showed absorption at 287 nm, while triphenylamine and diphenylmethylamine showed absorption at 305 nm and 287.5 nm, respectively.

EXAMPLES 8 AND 9

Copolymer were prepared in accordance with the procedures of Example 7, except that 28 g and 14 g of diphenylamine were used instead of 55 g of diphenylamine. They indicated the presence of 8.1 mol % and 2.2 mol %, respectively, of diphenyl amine copolymerized therein.

EXAMPLE 10

The copolymers obtained in Examples 7 to 9 and a 2,6-xylenol homopolymer were reprecipitated from